(No Model.)
L. G. ANTHONY.
SPEED INDICATING ALARM.
No. 582,971.                   Patented May 18, 1897.
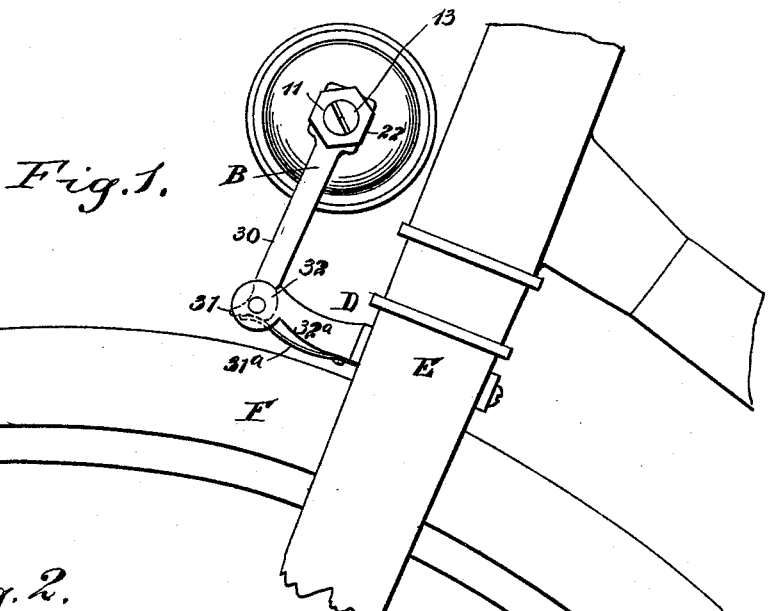
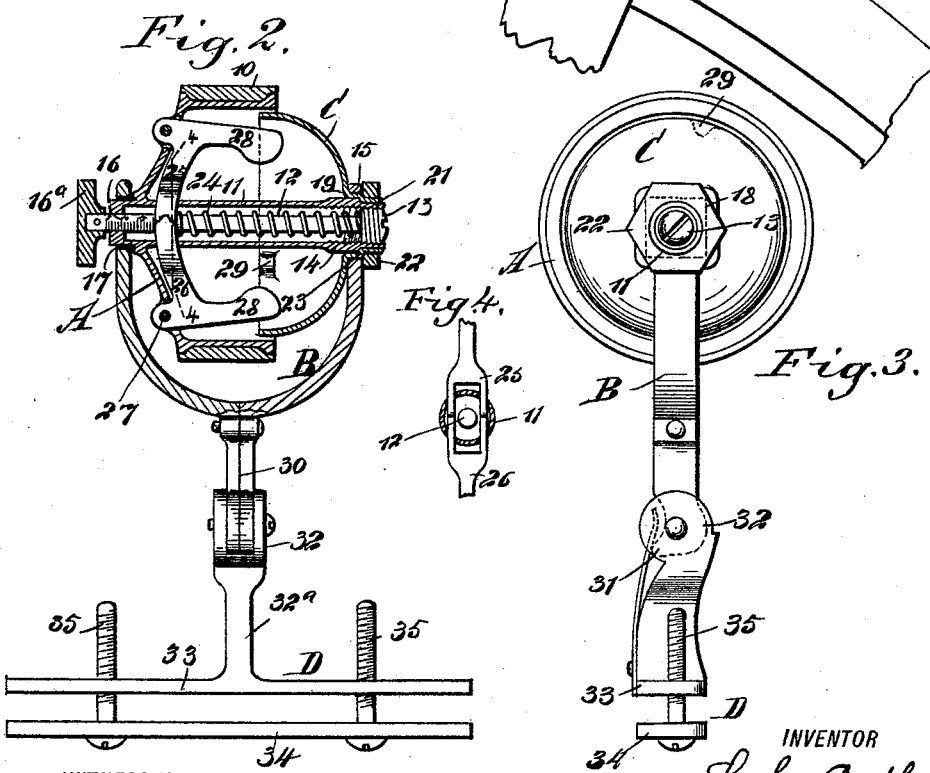
WITNESSES:
INVENTOR
L. G. Anthony
BY
ATTORNEYS.

UNITED STATES PATENT OFFICE.

LEON GIBSON ANTHONY, OF SALT LAKE CITY, UTAH.

SPEED-INDICATING ALARM.

SPECIFICATION forming part of Letters Patent No. 582,971, dated May 18, 1897.

Application filed August 12, 1896. Serial No. 602,547. (No model.)

*To all whom it may concern:*

Be it known that I, LEON GIBSON ANTHONY, of Salt Lake City, in the county of Salt Lake and State of Utah, have invented a new and useful Improvement in Speed-Indicating Alarms for Vehicles, of which the following is a full, clear, and exact description.

The object of my invention is to provide a speed-indicating alarm for vehicles, especially bicycles, the indicator being so constructed that after it is set to indicate a predetermined speed when the limit of speed is exceeded the regulator will give an alarm, notifying the rider that the maximum of speed is being exceeded, and will continue sounding until the speed is reduced.

A further object of the invention is to construct a speed-indicator that will be driven from one of the supporting-wheels of the vehicle and which may be carried out of engagement with the said supporting-wheel at any time desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the upper portion of the fork of a bicycle, illustrating the application thereto of the speed-indicator, the regulator, however, being shown out of engagement with the wheel journaled in the said fork. Fig. 2 is a vertical section taken through the said indicator at a point near its center. Fig. 3 is an enlarged side elevation of the speed-indicator detached from the vehicle, and Fig. 4 is a section taken substantially on the line 4 4 of Fig. 2.

In carrying out the invention a wheel A is constructed closed at one side and open at the other, and when the indicator is used on a bicycle, as illustrated, the left-hand side of the wheel is closed and the right-hand side is open. The wheel has a peripheral covering 10 of rubber, leather, or its equivalent, and is provided with a hub 11, which extends beyond the closed side and also beyond the open side of the wheel. The hub is tubular throughout, and the left-hand end of the hub is closed, except that a central opening is made therein, but the right-hand end of the hub is open. A gage-bar 12 extends through the hub, being fitted to the opening in its left-hand end. The gage-bar at its left-hand end is provided with a scale 16, corresponding with the adjustment necessary for different speeds. At the right-hand end of the gage-bar a head 13 is formed, and this head is exteriorly threaded to engage with an interior thread 14, formed at the open end of the hub, as shown in Fig. 2, and at its right-hand end the hub is provided near its extremity with an exterior shoulder 15, while at the left-hand end of the gage-bar a thumb-disk 16ª is detachably secured, and this thumb-disk is preferably provided with an opening so located that the scale 16 may be readily consulted.

The left-hand side of the hub 11 is journaled in an opening 17, which is made in a yoke or substantially U-shaped support B, but the opposite member of the said yoke is provided with a squared opening 18, (shown in dotted lines in Fig. 3,) through which a tubular extension 19 of a gong C is projected. The said tubular extension 19 is square or polygonal, so that the gong cannot turn in its support, but the outer extremity 21 of the extension of the gong is round and exteriorly threaded in order that it may receive a lock-nut 22. The circular portion of the extension of the gong is reduced, forming an interior shoulder 23, against which the shoulder 15 of the wheel-hub bears, regulating the position of the hub with respect to the gong. The gong is of such a diameter that it will nearly fill the opening in the right-hand side of the wheel, which opening it enters, as shown in Fig. 2.

A spring 24 is made to encircle the gage-bar 12. This spring has bearing against the head 13 of the gage-bar and against two arms 25 and 26, which arms are made to pass through suitable openings in the hub 11, as shown in Fig. 4, and are in interlocking engagement, the inner ends of the arms being bifurcated, so as to span the gage-bar 12. Each of the arms 25 and 26 is journaled by means of pins 27 in the left-hand or closed end of the wheel A. These arms are of equal dimensions and of equal weight, and each at its outer end is provided with a horizontally-located hammer 28, adapted, when the arms are drawn inward, compressing the spring 24, to engage with an offset 29 on the interior of the gong and so sound an alarm. Normally, however, the spring 24 forces the striking-arms 25 and 26 to such a position that their hammer-sections 28 will be free from engagement with the gong as the said arms revolve with the wheel. It is evident that the right-hand end of the wheel-hub 11 will turn freely in the tubular extension of the gong C.

The support B for the gong and the wheel is preferably made in two sections and is provided with a shank 30, the members being held together by set-screws or their equivalents. The shank 30 at its lower end terminates in a foot 31, concaved upon its end and one side edge. This is journaled in the head 32 of an extension 32ª from a clip D, and a spring 31ª is attached to the said extension of the clip and bears against one or the other of the concavities in the side of the foot 31 of the wheel-support, holding the said support in a vertical position, as shown in Fig. 1, or in a horizontal position, which will bring the cushioned periphery of the wheel in engagement with the tire of the front wheel F of a bicycle journaled in the usual manner in the fork E.

The body of the clip D consists of two parallel bars 33 and 34, connected by adjusting-screws 35. One of these bars engages with the front of the fork and the other with the rear thereof, the adjusting-screws 35 being employed to hold the bars in close engagement with the fork of the bicycle.

In the operation of the device suppose that it is desired to restrict the speed of the machine so that it shall not travel over twelve miles an hour. The thumb nut or disk 16ª is held with its recessed side upward, so that the scale on the gage-bar may be read. The wheel A is next turned until the mark representing twelve miles is shown on the scale of the gage-bar as appearing at the left-hand end of the hub of the said wheel. This being accomplished, as long as a speed of less than twelve miles an hour is maintained the wheel A revolves, but the force of the spring 24 surrounding the gage-bar will be greater than the centrifugal force, and the levers 25 and 26 will remain forced outward by the spring retaining their hammer-sections out of possible engagement with the gong. As soon as the speed exceeds twelve miles an hour the centrifugal force, acting upon the levers 25 and 26, will overcome the force of the spring 24, and the hammer portions of the said lever-arms will be forced outward, bringing them in the path of the projection 29 of the gong as the lever-arms are revolved and causing a continuous alarm, which will sound until the speed is reduced within the predetermined limits or until the speed-indicator is moved from engagement with the wheel of the machine.

The advantages of this device are apparent. It may be used not only to determine whether or not the bicycle is traveling at a rate of speed legally set or within said rate, but it may also be employed as a reminder to such riders as are liable to unconsciously attain a speed greater than that which should be maintained to maintain and preserve a proper physical condition, and it also may be used with advantage by persons starting out to make an extended run or tour within a specified time, enabling them to regulate the speed according to the distance to be traveled and the time employed, avoiding overexertion at the first part of the journey and the necessity of a forced speed at or near the end of the journey.

Having thus described my invention, I claim as new and desire to secure by Letters Patent—

1. In a speed-indicator, the combination of a wheel adapted to engage the periphery of a rotating body, and spring-restrained levers pivoted thereto, and adapted to be swung outward under the influence of centrifugal force to engage the gong, with a fixed gong having a bell-mouth surrounding the free ends of said levers, substantially as described.

2. In a speed-indicator, the combination of spring-restrained weights mounted to rotate in unison with a revolving body, and adapted to be swung outward by centrifugal force acting in opposition to the springs, with a fixed hollow gong surrounding said weights and having an inward projection in the path of the weights, substantially as described.

3. In a speed-indicator, the combination of spring-restrained weights mounted to rotate in unison with a revolving body, with a fixed hollow gong surrounding said weights and having an inward projection in the path of the weights, and means for adjusting the tension of the restraining-springs, substantially as described.

4. In a speed-indicator, the combination of a wheel adapted to engage the periphery of a rotary body, spring-restrained levers pivoted thereto, and means for adjusting the tension of the springs, with a fixed gong having a bell-mouth surrounding said levers and having an inner projection in the path of said levers, substantially as described.

5. In a speed-indicator, the combination of a hollow wheel adapted to engage the periphery of a revolving wheel or other body to be gaged, bell-crank levers pivoted to the sides thereof within the same, a spring engaging the inner ends of said levers, with a fixed gong having a bell-mouth surrounding the free ends of said levers and having an inward projection in the path of said levers, substantially as described.

6. In a speed-indicator, the combination of a hollow wheel adapted to be rotated in unison with a revolving body, said wheel having an open side and a hollow hub projecting beyond the open side of the wheel, said hub being provided with slots for reception of the inner ends of the weight-levers, with weight-levers pivoted to the wheel and having their inner ends passing through the slots in the wheel-hub, a restraining-spring within said hub engaging said levers, and a gong adapted to be engaged by the free ends of the weight-levers when a certain speed is reached or exceeded, substantially as described.

7. In a speed-indicator, the combination of a hollow wheel adapted to be rotated in unison with a revolving body, said wheel having an open side and a hollow hub projecting beyond the open side of the wheel, said hub being provided with slots for reception of the inner ends of the weight-levers, with weight-levers pivoted to the wheel and having their inner ends passing through the slots in the wheel-hub, a restraining-spring within said hub engaging said levers, and a fixed hollow gong surrounding the weight-levers and having an inward projection adapted to be struck by said levers upon reaching a certain speed, substantially as described.

8. In a speed-indicator, the combination of a hollow wheel adapted to be rotated in unison with a revolving body, said wheel having an open side and a hollow hub projecting beyond the open side of the wheel, said hub being provided with slots for reception of the inner ends of the weight-levers, with weight-levers pivoted to the wheel and having their inner ends passing through the slots in the wheel-hub, a restraining-spring within said hub engaging said levers, an adjustable stop for said spring within the hub, and a gong adapted to be engaged by the free ends of the weight-levers when a certain speed is reached or exceeded, substantially as described.

9. In a speed-indicator for bicycles and other vehicles, a wheel, a gage-bar carried by the said wheel, hammers likewise carried by the wheel, having movement on the gage-bar, a tension device carried by the gage-bar and in engagement with the said hammers, a gong arranged for engagement by the said hammers, a support for the wheel and the gong, a clamp whereby the support is attached to the vehicle, and means for holding the support in a vertical or in a horizontal position, as and for the purpose set forth.

10. In a speed-indicator for bicycles and like machines, the combination, with a support, a clamp for attachment to a vehicle, and a regulating device for the said support, of a wheel mounted to turn in the said support, a gage-bar adjustably carried by the said wheel, which wheel is open at one side and closed at the other, a gong stationarily attached to the support and located at the open side of the wheel, levers fulcrumed upon the wheel and extending around the gage-bar, each lever being provided with a hammer at its free end, and a spring having bearing against the hammer-levers and carried by the said wheel, the spring exerting tension in an outwardly direction against the hammer-levers, the hammer-sections of which levers are arranged for engagement with the gong when forced outwardly by centrifugal force, as and for the purpose specified.

LEON GIBSON ANTHONY.

Witnesses:
N. A. AUBREY,
N. A. SHUMAN.